(12) United States Patent
Sanderson et al.

(10) Patent No.: US 8,731,341 B2
(45) Date of Patent: May 20, 2014

(54) SIGNAL IDENTIFYING APPARATUS FOR AN OPTICAL FIBER

(75) Inventors: Jim Sanderson, Landrum, SC (US); Brian Watson, Northfield, NH (US); Jianxun Fang, Concord, NH (US)

(73) Assignee: AFL Telecommunications LLC, Spartanburg, SC (US)

( * ) Notice: Subject to any disclaimer, the term of this patent is extended or adjusted under 35 U.S.C. 154(b) by 343 days.

(21) Appl. No.: 13/043,006

(22) Filed: Mar. 8, 2011

(65) Prior Publication Data

US 2011/0158580 A1 Jun. 30, 2011

Related U.S. Application Data

(63) Continuation-in-part of application No. 12/280,921, filed as application No. PCT/US2007/084794 on Nov. 15, 2007, now Pat. No. 7,916,983.

(60) Provisional application No. 60/866,302, filed on Nov. 17, 2006.

(51) Int. Cl.
*G01N 21/00* (2006.01)
*G02B 6/00* (2006.01)

(52) U.S. Cl.
USPC .............................. 385/12; 385/147; 356/73.1

(58) Field of Classification Search
None
See application file for complete search history.

(56) References Cited

U.S. PATENT DOCUMENTS

| | | | |
|---|---|---|---|
| 3,931,518 A | 1/1976 | Miller | |
| 5,009,479 A * | 4/1991 | Morrison | 385/15 |
| 5,067,786 A | 11/1991 | Hawkins et al. | |
| 5,138,690 A * | 8/1992 | Cox | 385/137 |
| 5,159,399 A * | 10/1992 | Lieber et al. | 356/73.1 |
| 5,347,602 A * | 9/1994 | Finzel | 385/25 |
| 5,519,795 A | 5/1996 | Bender et al. | |
| 5,537,500 A | 7/1996 | Yokoyama | |
| 5,708,499 A | 1/1998 | Baden et al. | |
| 5,742,715 A | 4/1998 | Boehlke et al. | |
| 5,781,285 A | 7/1998 | Mampaey et al. | |
| 6,137,780 A | 10/2000 | Darcie et al. | |
| 6,406,196 B1 | 6/2002 | Uno et al. | |
| 6,590,659 B2 | 7/2003 | Melnyk et al. | |

(Continued)

FOREIGN PATENT DOCUMENTS

| | | |
|---|---|---|
| JP | 22-234039 A | 9/1990 |
| JP | 2004-109401 A | 4/2004 |

(Continued)

OTHER PUBLICATIONS

European Patent Office, "Communication Pursuant to Rules 70(2) and 70a(2) EPC," issued in connection with European Patent Application No. 07864442.4, dated Mar. 21, 2011.

(Continued)

*Primary Examiner* — Michelle R Connelly

(74) *Attorney, Agent, or Firm* — Sughrue Mion, PLLC

(57) ABSTRACT

Provided is a signal identifying apparatus for an optical fiber that includes a detecting portion capable of detecting a signal originating from a first end of the optical fiber and a signal originating from a second end of the optical fiber. Additionally, the signal identifying apparatus includes an identifying portion that identifies a desired signal by separating the signal originating from the first end of the optical fiber from the signal originating from the second end of the optical fiber.

15 Claims, 13 Drawing Sheets

(56) References Cited

U.S. PATENT DOCUMENTS

| | | | |
|---|---|---|---|
| 6,912,085 B2 | 6/2005 | Hakomori et al. | |
| 7,187,861 B2 | 3/2007 | Ruchet | |
| 2003/0113118 A1 | 6/2003 | Bartur | |
| 2008/0024769 A1* | 1/2008 | Frigo et al. | 356/73.1 |

FOREIGN PATENT DOCUMENTS

| | | |
|---|---|---|
| JP | 2004-109401 A | 8/2004 |
| JP | 2004-325334 A | 11/2004 |
| JP | 2005-156210 A | 6/2005 |

OTHER PUBLICATIONS

European Patent Office, "Communication with Extended European Search Report," issued in connection with European Patent Application No. 07864442.4, dated Mar. 2, 2011.

OFI Optical Fiber Identifier User's Guide.

Chinese Office Action issued in corresponding Chinese Application No. 200780001177 dated Jul. 31, 2012.

* cited by examiner

SIGNAL IDENTIFYING APPARATUS FOR AN OPTICAL FIBER

This application is a Continuation-in-Part of application Ser. No. 12/280,921 filed on Aug. 27, 2008, which is a 371 Application of PCT/US07/84794 filed on Nov. 15, 2007, which claims the priority of U.S. Provisional Application No. 60/866,302 filed on Nov. 17, 2006. The entire disclosure of the prior applications is hereby incorporated by reference.

BACKGROUND OF THE INVENTION

1. Field of the Invention

The present invention relates to fiber optic communication systems. In particular, embodiments of the present invention relate to apparatuses and methods that can be used to detect the presence of high speed data from an active component in a passive optical network.

2. Description of the Related Art

Conventional Optical Fiber Identifiers (OFIs) are rugged, handheld, and easy-to-use fiber optic test instruments designed to detect optical signals transmitted through an optical fiber without disrupting traffic.

One type of optical fiber identifier that can be used to test optical fibers uses the principle of macrobending. A macrobend device is one that imposes a large physical distortion on the fiber, by, for example, causing the fiber to conform to the shape of a bending part. By bending the fiber around a bending part, the macrobend optical fiber identifier can detect light which escapes the fiber at the bend.

Another type of device used to identify optical fibers is a microbend device. A microbend device imposes a small bend on the optical fiber in relation to the physical dimensions of the fiber.

During installation, maintenance, rerouting, or restoration, it is often necessary to isolate a specific fiber. By simply clamping an OFI unit onto a gently bent fiber, the unit will indicate whether the fiber is in use. More specifically, a related art OFI may be able to detect if there is a signal, tone, or traffic present on the fiber and identify the signal direction, if any.

An example of a related art Optical Fiber Identifier can be seen in FIG. 1. The Optical Fiber Identifier 100 of FIG. 1 includes a fiber groove 120, into which the fiber 110 is inserted for signal detection. Additionally, the OFI 100 of FIG. 1 includes a plurality of signal indicators, such as, for example, Traffic indicator 130, No Signal indicator 140, Tone indicator 150 and Power indicator 160.

The No Signal indicator 140 indicates that no light has been detected in the optical fiber. The Traffic indicator 130 indicates that light is present on the fiber, and may also indicate the direction of the light. The Power indicator 160 simply alerts the user if the battery needs to be changed. The Tone indicator 150 may indicate the presence of a tone signal. In the related art, a tone signal can be used to select a fiber from a plurality of fibers. Typically, this involves connecting one end of an unknown fiber to a light source at one location and injecting a predetermined tone signal. Commonly a light source that generates 270 hz, 1 Khz and 2 Khz signals is used as the tone generator. A tone signal is typically a square wave that has a 50% duty cycle, however, other duty cycles may be used. Next, a related art OFI, such as OFI 100, is clamped onto a bundle of unknown fibers at the other location. If the OFI detects the predetermined light signal, for example 2 Khz, the fiber is identified.

With regard to duty-cycles, this can be understood as the percentage of time the signal is above a threshold. For example, the duty cycle of a light signal may be the percentage of time that light is transmitted through the fiber.

Optical fiber identifiers, such as OFI 100, are normally set to have a very large sensitivity but a rather small bandwidth. More specifically, the bandwidth is usually set to be between 0 and 2 Khz. Since these OFIs are designed to detect 2 Khz or less, there is no reason to make the bandwidth any greater than 2 Khz. Moreover, electrical noise in a circuit is directly proportional to the bandwidth, thus, the bandwidth is selected to be no more than that which is necessary. In another approach to increasing sensitivity, related art optical fiber identifiers typically rely on DC-coupling, as AC-coupling may negatively impact signals at low frequencies.

However, new high speed fiber optic communication systems, such as passive optical networks (PONs), are now being deployed to businesses and residential areas around the world. In these new systems, the rates of data transmission are high, for example, greater than 155 Mbps. Because related art OFIs, such as those described above, have a limited amount of bandwidth, these OFIs have only a limited value in the new high speed systems. In particular, because the OFI described above is set to detect only low speed signals, high speed signals are only displayed only as an average of the time light is present on the fiber and the time no light is present. Consequently, the OFI is not able to detect the direction of a signal with the accuracy required.

Consider the situation where one end of the optical fiber under test is connected and the other end is disconnected. In this case the OFI described above may indicate that there is traffic and would give no indication that there is an obvious problem with this disconnected fiber. Because the OFI described above has only a limited bandwidth, and the duty cycle of the new high speed fiber optic systems can be very small, the OFI described above may be able to provide an average power, but cannot accurately detect the upstream PON signals being transmitted through the optical fiber.

Accurately detecting disconnected optical fibers can be essential for a high speed network provider. That is, without an ability to accurately detect and identify disconnected fibers, it is very difficult for the network provider to keep accurate records of who is connected and who is not connected to their network. Much like the phone system, an individual fiber is brought to a box on the side of an individual business/residence. At the business/residence, the fiber may or may not be connected to the network inside the structure, similar to traditional phone and cable TV systems. Now consider the situation where a customer subscribes to this high speed network and then decides to discontinue service. At this time, the provider simply disconnects this fiber at box on the side of the business/house. Now, unless the provider's database is updated, the provider has a lost fiber at the distribution point for this business/residence. In particular, unless the line is physically disconnected at the distribution point and an alarm goes off in the provider's network, the provider has lost a line. Disconnecting lines and checking for alarms is time consuming and can temporarily disrupt service to customers.

Also, optical fibers used in the field typically have diameters of 900 um, 2 mm, and 3 mm. Optical fibers having diameters of 2 mm and 3 mm consist of a 900 um buffered fiber surrounded by a flexible strength member, such as Kevlar®, and enclosed by a polymer tube. The polymer tube stiffness can vary greatly between fibers and over different temperatures.

In view of the above, there is need for an optical fiber identifying device which can accurately detect the presence or absence of a predetermined high speed signal on an optical fiber.

SUMMARY OF THE INVENTION

Exemplary embodiments of the present invention overcome the above disadvantages and other disadvantages not described above and provide advantages which will be apparent from the following description of exemplary embodiments of the invention. However, the present invention is not required to overcome the disadvantages described above.

According to one exemplary embodiment of a signal identifying apparatus for an optical fiber, the apparatus may include a detecting portion that detects a signal originating from a first end of the optical fiber and a signal originating from a second end of the optical fiber; and an identifying portion that identifies a desired signal by separating the signal originating from the first end of the optical fiber from the signal originating from the second end of the optical fiber. In this exemplary embodiment, the identifying portion and the detecting portion may be AC-coupled or DC-coupled.

In this exemplary embodiment, the signal originating from the first end of the optical fiber may be an upstream signal and the signal originating from the second end of the optical fiber may be a downstream signal, wherein the two signals may have different frequencies. Additionally, the desired signal may be the upstream or downstream signal.

In this exemplary embodiment, the identifying portion may be a filter, such as, for example, a low pass filter, or a band pass filter, and the parameters of the filter correspond to the desired signal. Exemplary parameters of the filter that can be adjusted include duty cycle of the desired signal and bandwidth of the desired signal. Additionally, this exemplary embodiment of the signal identifying apparatus may include a mixing portion that combines the signal originating from the first end of the optical fiber and the signal originating from the second end of the optical fiber into a mixed signal.

In this exemplary embodiment of the signal identifying apparatus, the signal originating from the first end of the optical fiber may be a burst of short pulses and the signal originating from the second end of the optical fiber may be a series of short pulses. Furthermore, the signal identifying apparatus of this exemplary embodiment may include a power detector that measures peak power of the signal originating from the first end of the optical fiber and peak power of the signal originating from the second end of the optical fiber.

In another exemplary embodiment, the signal identifying apparatus for an optical fiber may include a detecting portion that detects a signal originating from a first end of the optical fiber and a signal originating from a second end of the optical fiber, wherein the signal originating from the first end of the optical fiber is an upstream signal and the signal originating from the second end of the optical fiber is a downstream signal; a mixing portion that combines the upstream signal and the downstream signal; and an identifying portion that identifies a desired signal by separating the upstream signal and the downstream signal.

Other exemplary embodiments may be directed to methods of identifying signals in an optical fiber. For example, one method includes detecting a signal originating from a first end of the optical fiber; detecting a signal originating from a second end of the optical fiber; and identifying a desired signal by separating the signal originating from the first end of the optical fiber from the signal originating from the second end of the optical fiber.

According to this exemplary embodiment the signal originating from the first end of the optical fiber is separated from the signal originating from the second end of the optical fiber according to parameters of the desired signal. Examples of these parameters include the duty cycle of the desired signal and the bandwidth of the desired signal. More specifically, in one exemplary embodiment, the signal originating from the first end of the optical fiber is separated from the signal originating from the second end of the optical fiber using a low pass filter or a band pass filter, but is not limited to the above.

According to this exemplary embodiment, the method may also include combining the signal originating from the first end of the optical fiber and the signal originating from the second end of the optical fiber into a mixed signal. Furthermore, the method of this exemplary embodiment may include measuring peak power of the signal originating from the first end of the optical fiber and peak power of the signal originating from the second end of the optical fiber.

According to another exemplary embodiment, a signal identifying apparatus for an optical fiber may include a plunger which bends an optical fiber; a detecting portion which detects optical signal parameters from the optical fiber; and a mechanism which moves the plunger in a direction towards the detecting portion to bend the optical fiber.

The plunger may have a first portion having a first bend radius and a second portion having a second bend radius larger than the first bend radius, and may be repositionable for bending an optical fiber with the first portion or with the second portion.

The plunger may further include a flexible portion surrounding the first and second portions such that the flexible portion prevents entry of ambient light into the first and second portions, and the flexible portion may further provide a separation between the first and second portions.

According to this exemplary embodiment, the signal identifying apparatus for an optical fiber may further include a mechanism stop part, wherein the mechanism operates to move the plunger in the direction towards the detecting portion until the mechanism contacts the mechanism stop part, and wherein the mechanism stop part is disposed to stop movement of the mechanism at a position which provides a predetermined clearance between the plunger and a detecting portion when the mechanism is operated to move the plunger.

The mechanism may further include a mechanism stop adjusting part which is adjustable for setting the predetermined clearance.

According to another exemplary embodiment, a method of identifying signals in an optical fiber with a signal identifying apparatus is provided. The method may include selecting a plunger orientation by positioning the plunger to align a first portion of the plunger having a first bend radius with a detecting portion or aligning a second portion of the plunger having a second bend radius with the detecting portion; positioning the optical fiber in a fiber groove in a housing of the signal identifying apparatus; operating a mechanism to move the plunger towards the detecting portion to bend the optical fiber until a predetermined clearance between the plunger and the detecting portion is reached; and detecting optical signal parameters with the detecting portion.

BRIEF DESCRIPTION OF THE DRAWINGS

The above and other features and advantages of the present invention will become more apparent from detailed exemplary embodiments set forth hereinafter with reference to the attached drawings in which.

DETAILED DESCRIPTION OF EXEMPLARY EMBODIMENTS OF THE INVENTION

Figure 1:
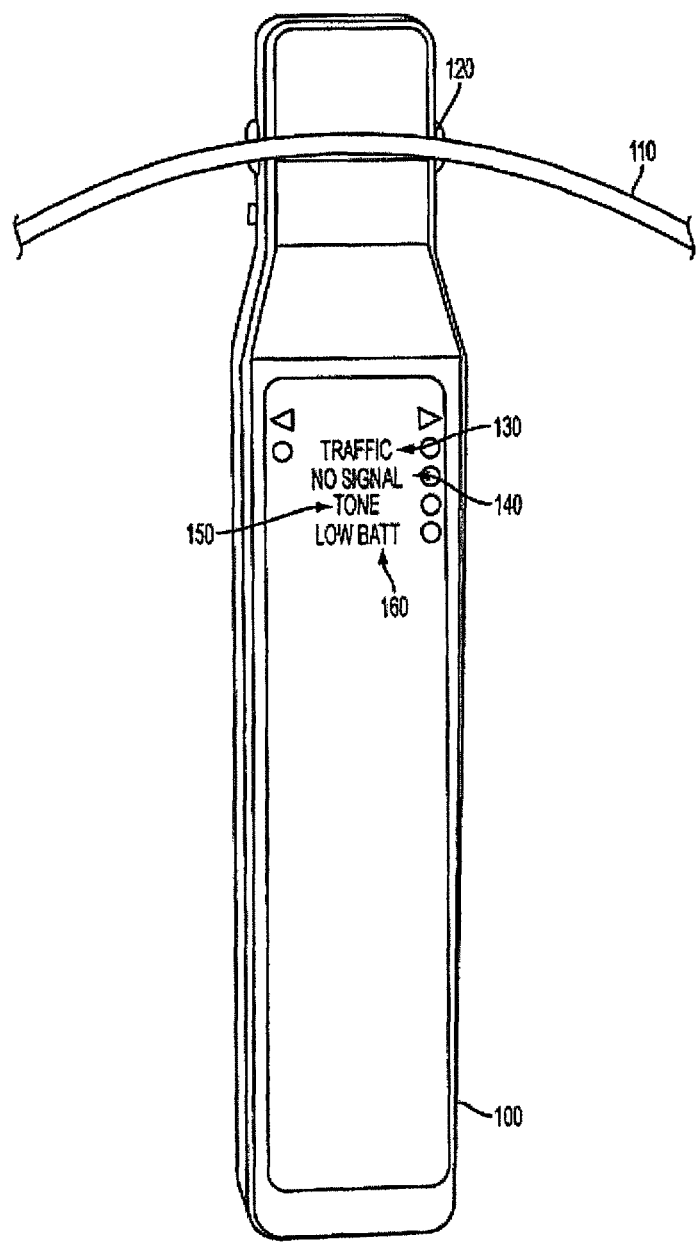
FIG. 1 is an example of a related art optical fiber identifier.

The present invention will now be described more fully with reference to the accompanying drawings, in which exemplary embodiments of the invention are shown. Like reference numerals in the drawings denote like elements.

Figure 2:
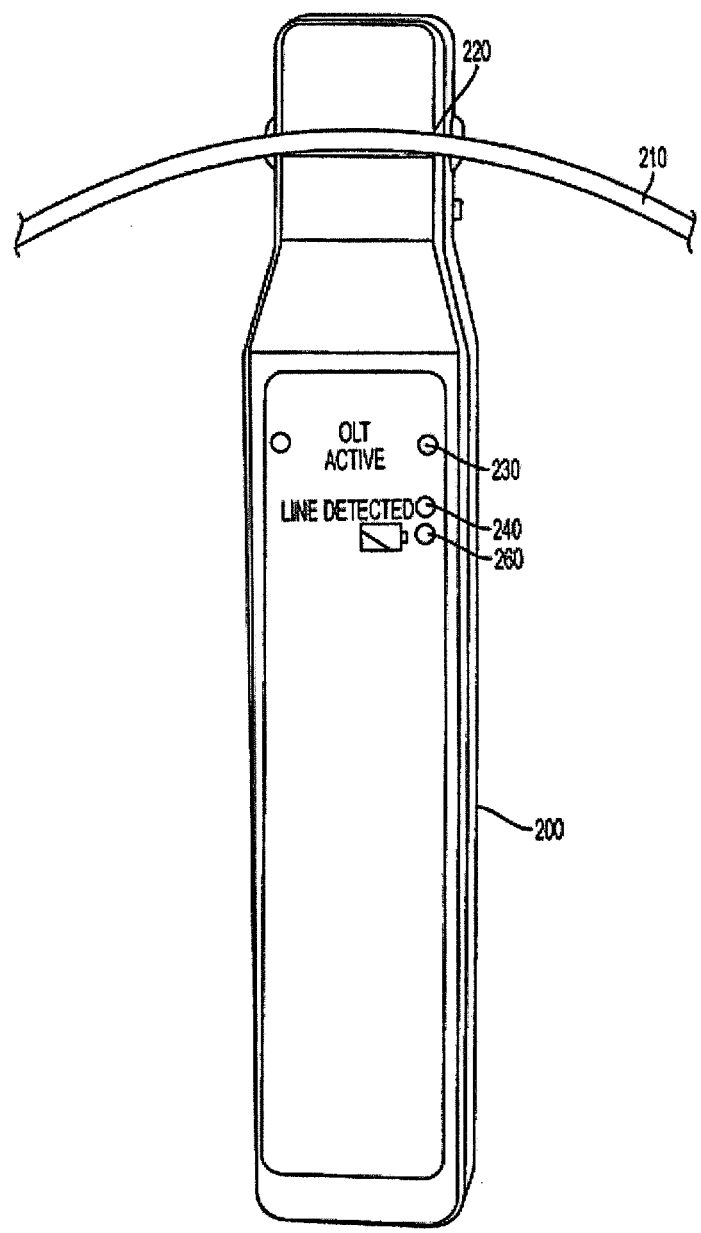
FIG. 2 is an example of an optical fiber identifier according to one exemplary embodiment of the present invention.

Referring to FIG. 2, there is disclosed an Optical Fiber Identifier according to an exemplary embodiment of the present invention. The Optical Fiber Identifier 200 of FIG. 2 includes a fiber groove 220, into which the fiber 210 is inserted for signal detection. Additionally, the OFI 200 of FIG. 2 includes a plurality of signal indicators, such as, for example, Desired Signal indicator 230, No Signal indicator 240 and Power indicator 260.

One exemplary embodiment of the present invention is a new class of optical fiber identifier; one that will detect the presence of high speed data from an active component in an optical network. For this purpose, an exemplary embodiment of the OFI has both a large gain and a large bandwidth so that it may detect the high speed signal. A large gain is required because only a small portion of the light will be used by the identifier. The $OFI_{FTTX}$, is an optical fiber identifier, which, according to one exemplary embodiment of the present invention, can be used in optical fiber systems such as, for example, fiber to the home (FTTH), fiber to the premise (FTTP) or fiber to the curb systems (FTTC), collectively (FTTX).

Figure 3:
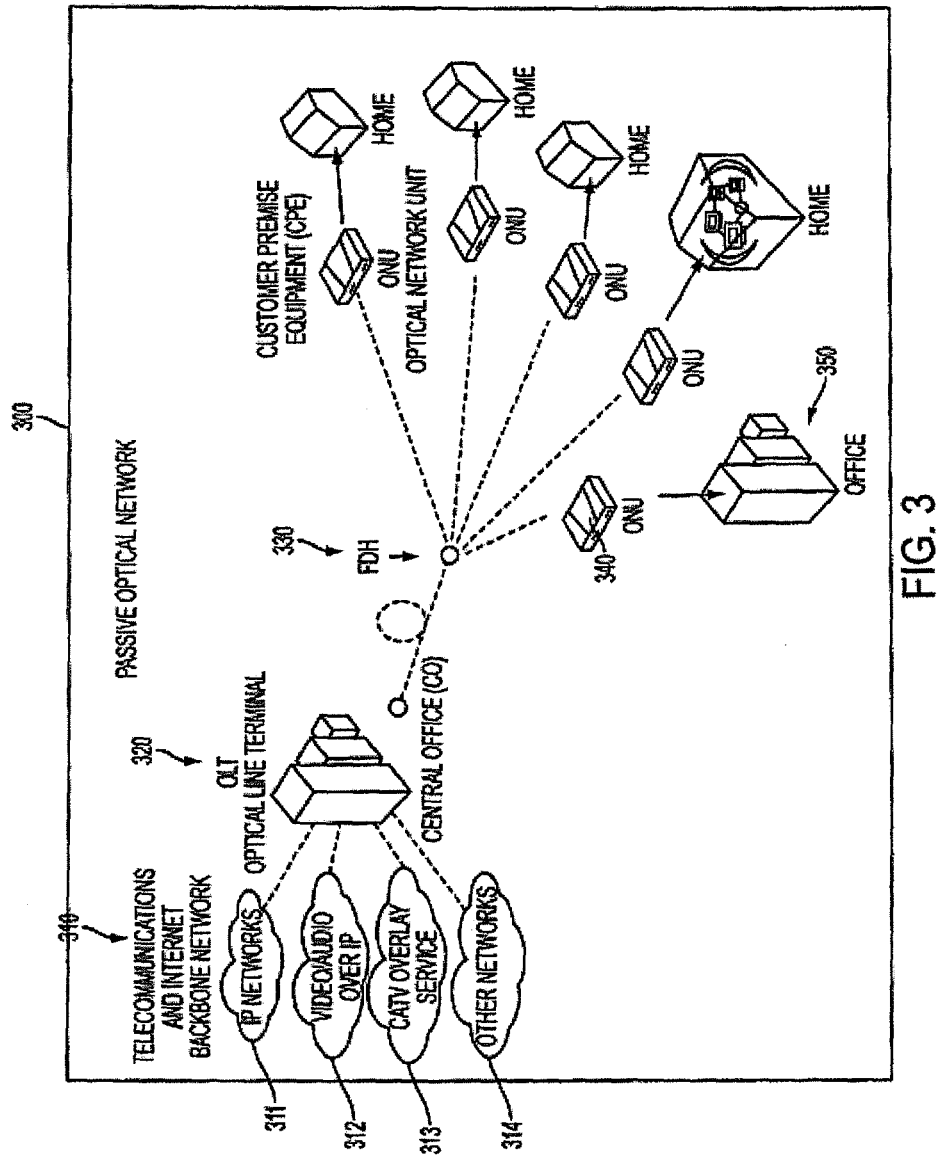
FIG. 3 is an example of a passive optical network in a fiber optic communication system.

FIG. 3 shows an example of a Passive Optical Network PON) 300) in a high speed optical fiber communication system. The PON 300) comprises a Telecommunications and Internet Backbone network 310) being connected to an Optical Line Terminal (OLT) 32. The Telecommunications and Internet Backbone network 310 can include, but is not limited to, Internet Protocol (IP) Networks 311, Video/Audio over IP 312, Cable Television (CATV) Overlay service (313 and Other networks (314. In this example, the OLT (320 is connected to a fiber distribution hub (FDH) 330 which splits the signal coming from the OLT 320 and sends the signal to a plurality of customers. The signal originating from the OLT 320 and being sent to the customer is hereinafter referred to as a "downstream" signal.

The PON 300 of FIG. 3 also includes customer premise equipment (CPE) such as an optical network unit (ONU) 340 or an optical network terminal (ONT) (not pictured). It will be understood that any type of customer service equipment may be used, however, hereinafter, the description will be limited to the ONU 340. The ONU 340 also sends a signal back to the OLT 320. The signal originating at the ONU 340 and being sent to the OLT 320 is known as the "upstream" signal.

In at least one embodiment of the passive optical network, the upstream signal may have a different frequency from the downstream signal. For example, the frequency of the upstream signal maybe higher than the frequency of the downstream signal. More specifically, in one exemplary embodiment, the downstream signal may have wavelengths of 1490 nm or 1550 nm, while the upstream signal may have a wavelength of 1310 nm.

Figure 4:
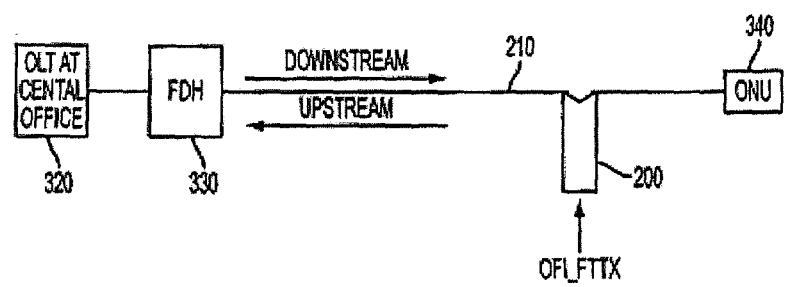
FIG. 4 is an example of measuring the upstream and downstream signals using an optical fiber identifier according to an exemplary embodiment of the present invention.

FIG. 4 is an example of measuring the upstream and downstream signals using an optical fiber identifier according to an exemplary embodiment of the present invention. In one exemplary embodiment, the $OFI_{FTTX}$ is attached to the optical fiber, such as optical fiber (210) shown in FIG. 2, between the FDH 330 and the ONU 340. In this manner, the $OFI_{FTTX}$ can be used to detect the upstream and downstream signals.

In one exemplary embodiment, the $OFI_{FTTX}$ serves as an active device (ONU) indicator. In other words, in this exemplary embodiment, the $OFI_{FTTX}$ can detect the upstream signal originating from the ONU 340 without disconnecting the optical fiber. If an upstream signal is present, the optical fiber 210 is likely connected to the ONU 340 and the optical fiber line is in use. In this regard, the $OFI_{FTTX}$ according to an exemplary embodiment of the present invention allows a high speed network provider to find lost lines and detect low power levels at the FDH 330 without disconnecting the fibers, looking for alarms or checking each subscriber's ONU 340 individually. This will save a high speed provider time, money and customer complaints, without disrupting their system.

With regard to the downstream signal, in the exemplary embodiment of the invention described above, the downstream signal is minimized. That is, the $OFI_{FTTX}$ will identify the upstream signal among the traffic present on the optical fiber. As such, for the purpose of at least one exemplary embodiment of the $OFI_{FTTX}$, the downstream signal amounts to noise which must be filtered out. However, embodiments of the present invention are not limited to the above. In other words, other exemplary embodiments of the present invention may identify the downstream signal while minimizing the upstream signal. Additionally, other embodiments of the present invention may accurately identify both the upstream and downstream signal, and indicate the direction of each signal to the user. Moreover, a plurality of signals may travel upstream or downstream on the optical fiber. In one exemplary embodiment of the present invention, a plurality of signals may be detected, or the signal to be identified may be chosen by the user.

The $OFI_{FTTX}$ according to one exemplary embodiment of the present invention avoids the problem of excessive noise, by utilizing large area photo detectors and then amplifying the signal. In this exemplary embodiment excessive noise due to unwanted signals is also avoided by tailoring the gain bandwidth around the upstream signal.

Figure 5:
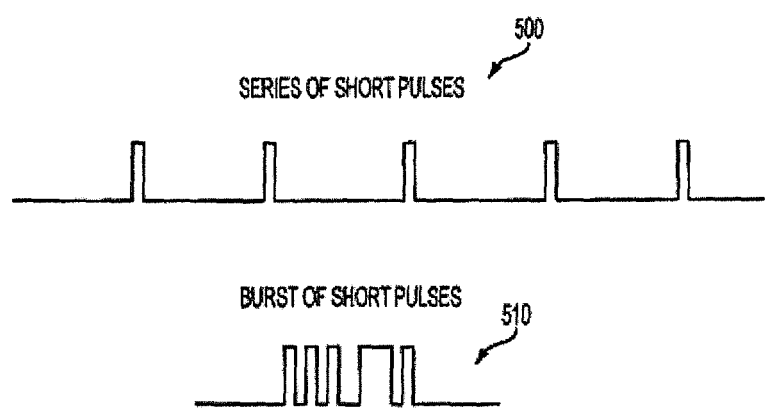
FIG. 5 is an example of the difference between the upstream and downstream signal in the optical fiber according to one exemplary embodiment of the present invention.

The upstream and downstream signals will now be described in more detail. FIG. 5 shows an example of an upstream and a downstream signal. As can be seen in FIG. 5, the downstream signal consists of a series of relatively evenly spaced very short pulses while the upstream signal consists of a large burst of very short pulses.

By relying on the difference between the upstream and downstream signals, the $OFI_{FTTX}$, in one exemplary embodiment of the present invention, can identify the desired signal from the signals present on the optical fiber. That is, in one exemplary embodiment, the upstream burst can be detected if the receiver of the $OFI_{FTTX}$ is AC-coupled and has a bandwidth that is large enough to detect the burst envelope of the burst pulses, but too small to detect the downstream series of pulses. In other words, in this exemplary embodiment, the bandwidth of the receiver of the $OFI_{FTTX}$ is set to detect the signal being transmitted from the ONU (340), the upstream signal. AC-coupling the $OFI_{FTTX}$ is one exemplary way to eliminate any low frequency signals and miscellaneous offsets that appear in our receiver, however, other exemplary embodiments of the present invention may involve an $OFI_{FTTX}$ receiver that is DC-Coupled.

According to one exemplary embodiment of the present invention, the bandwidth of the $OFI_{FTTX}$ is set to be large enough that, if a burst of pulses passes through the receiver of the $OFI_{FTTX}$ a burst envelope of the upstream signal will be detected. However, if a series of short pulses, such as the downstream signal shown in FIG. 5, passes through the $OFI_{FTTX}$ receiver, it will cause only a small disturbance in the noise floor of the detected signal. In other words, by setting the bandwidth according to the signal to be identified, the receiver can filter out the downstream pulses and retain only the upstream burst of pulses.

Figure 6:
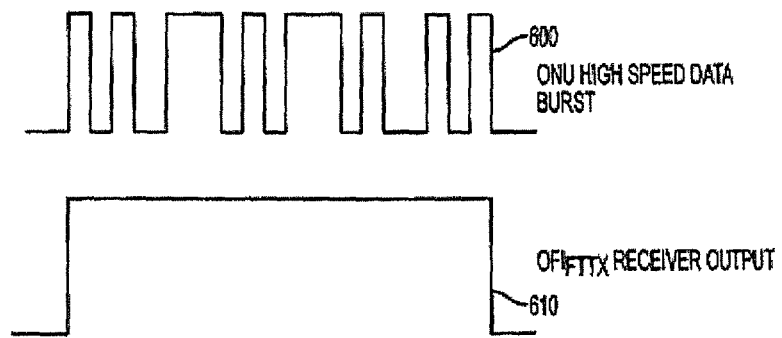
FIG. 6 is an example of high speed data burst from an optical network unit and an example of the output of the optical fiber identifier according to an embodiment of the present invention.

An example of a burst envelope of the upstream signal can be seen in FIG. 6. As shown in FIG. 6, the burst of pulses has about a 50% duty-cycle. Although various duty cycles can be used, most modern communication systems including FTTX systems keep the duty cycle at approximately 50% through a series of pseudo-random algorithms. The $OFI_{FTTX}$ according to at least one embodiment of the present invention uses the duty cycle to calculate the minimum bandwidth for detecting the desired, for example upstream, signal. In this exemplary embodiment, the minimum burst time is assumed to be equivalent to a single pulse with a pulse width of approximately 50% of the burst of pulses. Additionally, it is assumed that the downstream pulses are signals which have a significantly shorter pulse width than the upstream bursts. As such, the minimum bandwidth of the signal to be detected needs to be set to produce a pulse envelope (see for example reference number 610 in FIG. 5) equal to that of a single pulse with a pulse width of approximately 50% of the burst of pulses.

Although in one exemplary embodiment the duty-cycle of the burst of pulses, i.e. the pulses making up the burst envelope, in the upstream signal, is approximately 50%, the overall duty cycle of this signal can be very small, in some cases less than 1%. In other words, the actual burst of pulses amounts to only a small portion of the overall signal. Thus the desired signal to be identified from the traffic on the optical fiber will typically have a very small duty-cycle ratio.

If the burst of pulses, such as the one shown in FIG. 6, is present, the $OFI_{FTTX}$ receiver will output a burst envelope that corresponds to the burst of pulses. An example of the burst envelope is also shown in FIG. 6. By sending a burst of pulses through the $OFI_{FTTX}$ filter with a bandwidth less than that of the desired signal, the result is a burst envelope that has a height that is proportional to the duty cycle and a width that is approximately the same as the burst of pulses. In one exemplary embodiment, the filter of the $OFI_{FTTX}$ is a low pass filter adjusted to filter out the undesired signals. However, it will be understood that any kind of filter can be used, as long as the desired signal is identified, and the undesired signals are suppressed.

In addition to the upstream and downstream signals, other signals may be present within the fiber. For example, optical fibers in may contain analog video overlay signals. These signals correspond to, for example, cable television signals. By accurately setting the bandwidth to be detected by the receiver of the $OFI_{FTTX}$, the optical fiber identifier avoids erroneous detection of undesired signals present within the fiber. In other words, even though some light signals may be present on the optical fiber, if the desired signal is not detected among the signals, the $OFI_{FTTX}$ according to one exemplary embodiment of the present invention will indicate that no signal present on the fiber. That is, the $OFI_{FTTX}$ according to one exemplary embodiment of the present invention does not simply detect high speed signals, but is adjusted to seek the signal desired by the user.

Figure 8A:
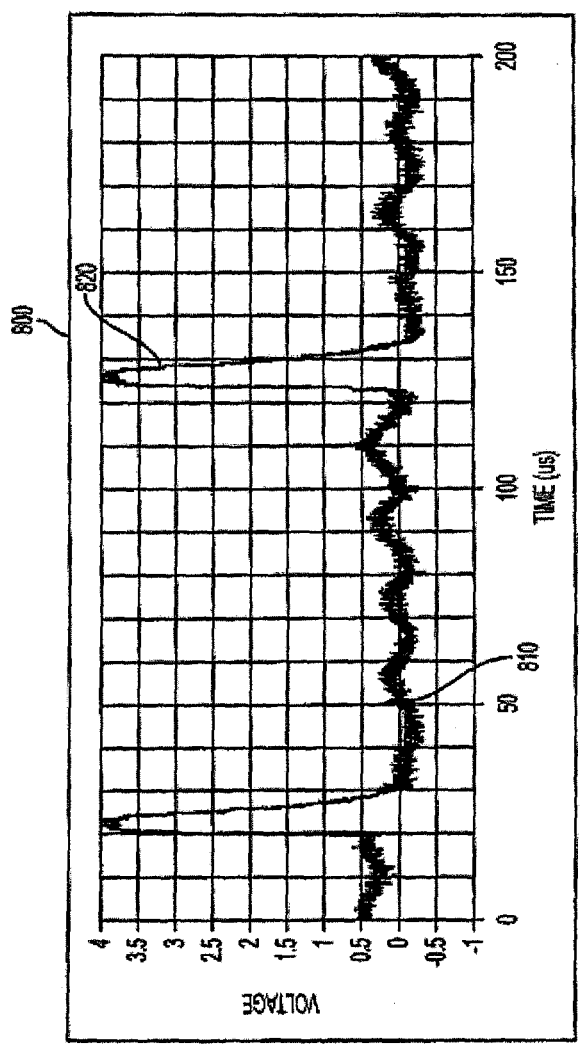
FIG. 8A is an example of the desired signal being detected by the optical fiber identifier according to one exemplary embodiment of the present invention.
Figure 8B:
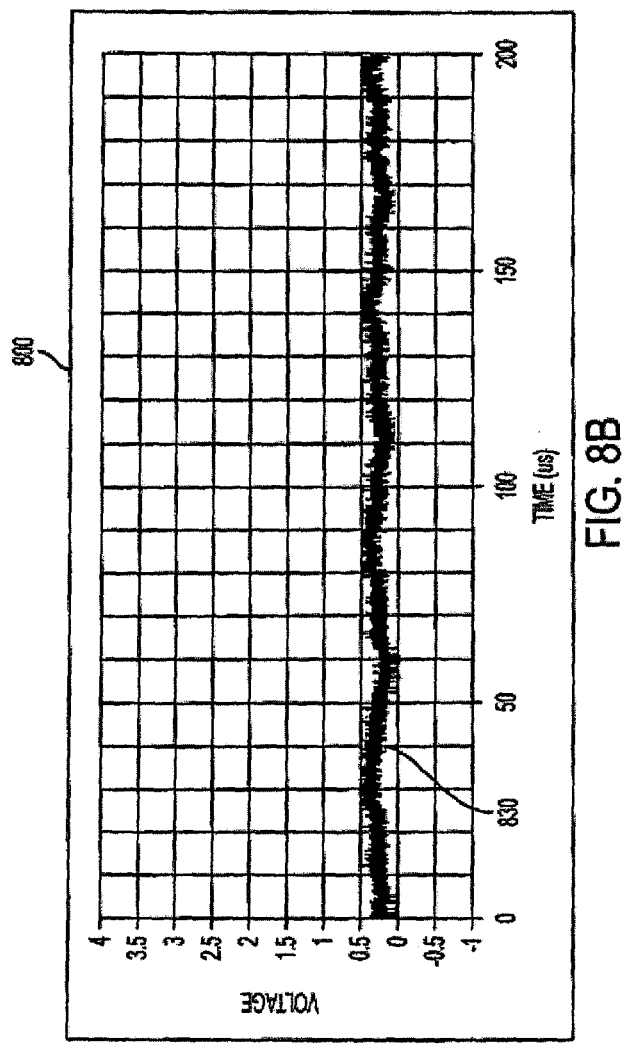
FIG. 8B is an example of the optical fiber system wherein the desired signal is not present.

FIG. 8A shows an example of the desired signal being detected by the $OFI_{FTTX}$ according to one exemplary embodiment of the present invention. In FIG. 8, the burst envelope is represented as the high peak 820, while any noise, such as for example, the undesired signals, is limited to the floor of the signal 810. Next, if the $OFI_{FTTX}$ does not detect the desired signal, the output of the receiver will indicate that no signal 830 is present. See, for example, FIG. 8B.

Figure 7:
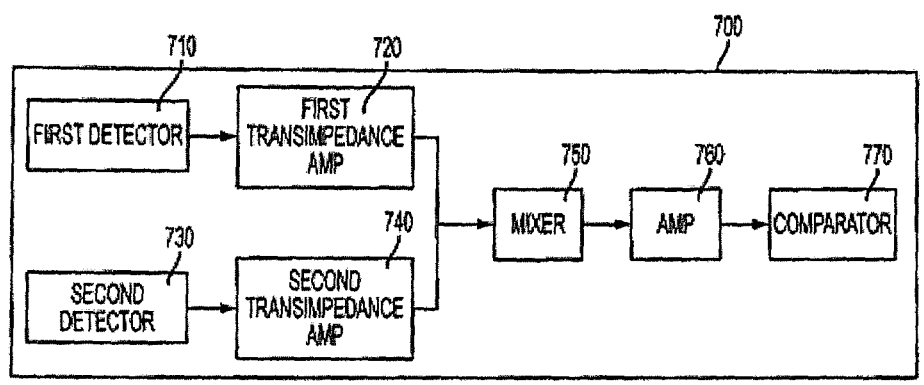
FIG. 7 is a schematic overview of the optical fiber identifier according to one exemplary embodiment of the present invention.

FIG. 7 is a schematic overview of the $OFI_{FTTX}$ according to one exemplary embodiment of the present invention. In the exemplary embodiment shown in FIG. 7, the $OFI_{FTTX}$ 700 includes a first detector 710 connected to a first transimpedence amplifier 720. Additionally, the $OFI_{FTTX}$ includes a second detector 730 connected to a second transimpedence amplifier 740. The outputs of the first transimpedence amplifier 720 and the second transimpedence amplifier 740 are combined using a mixer 750. After combining the signals output from the first and second transimpedence amplifiers 720, 740, the combined signal is amplified using an amplifier 760, and the desired signal is selected/identified from the combined signal in the comparator 770.

In the exemplary embodiment shown in FIG. 7, the first and second detectors 710, 730 are photodetectors which detect light that is present in the optical fiber and convert the detected light into current. The first and second transimpedence amplifiers 720, 740 convert the current signals from the photodetectors into corresponding voltage signals. In one exemplary embodiment of the present invention, the signals from the first and second amplifier 720, 740 are in phase and are combined/mixed/added together in the mixer 750 to form a composite signal.

In a situation when the user needs to identify an optical fiber at the fiber distribution hub, the user may not know which direction of the signals in the fiber is towards the ONU, because the fibers may be intertwined. However, summing the two signals allows the user to detect the desired signal, for example the upstream signal from the ONU, by clamping on the fiber from any orientation. In other words, the two detectors allow the clamping portion of the $OFI_{FTTX}$ to become direction independent.

The comparator 770 will select/identify the desired signal from among the signals within the combined signal. Next, the comparator 770 can output the identified or desired signal to the CPU (not pictured), which will relay this data to the user through signal indicators, such as for example the Desired Signal indicator 230 or No Signal indicator 240. It will be understood that, in one exemplary embodiment of the present invention, any function of the optical fiber identifier may be performed using digital logic.

In one exemplary embodiment of the present invention, circuits used to accomplish the functions described above may be AC-coupled. That is, because the signal to be detected is a high frequency signal, AC-coupling will not detrimentally impact the signal as can occur in the related art OFI systems. However, the $OFI_{FTTX}$ devices described herein are not limited to AC-coupled devices and in other exemplary embodiments of the present invention the $OFI_{FTTX}$ receiver may be DC-Coupled.

Additionally, the gain bandwidth product (GBP) must be properly set for the amplifier used in the exemplary embodiment of the present invention described above. The GBP allows the user to determine the maximum gain that can be extracted from the device for a given bandwidth and vice versa. In the $OFI_{FTTX}$ according to one exemplary embodiment of the present invention, the gain-bandwidth product is much larger than that of related art OFIs. More specifically, in one exemplary embodiment of the present invention, the gain-bandwidth product of the $OFI_{FTTX}$ is on the order of $10^{14}$ V/Ahz, as compared to $10^9$ V/Ahz for related art OFIs.

By increasing the GBP as described above, the $OFI_{FTTX}$ according to one exemplary embodiment of the present invention can detect high speed signals being transmitted through the optical fiber. More specifically, the GBP is set to identify the desired signals present on the optical fiber. In one exemplary embodiment, the GBP is fixed into the hardware, however, other embodiments may allow the user to control the GBP as desired.

In addition to simply detecting the ONU, other exemplary embodiments of the $OFI_{FTTX}$ have the potential to measure the ONU peak power. Measuring the peak power would allow providers to detect low power levels before bit error rates increase. Adding automatic gain control circuits to the $OFI_{FTTX}$ would also allow for an increased range of measurements.

In another exemplary embodiment, the Optical Fiber Identifier 200 may include a flippable two-side plunger having rigid bending elements for bending an optical fiber. A bend profile on one side of the bending element of the flippable plunger may be different from the bend profile on the other side of the bending element.

Figure 9A:
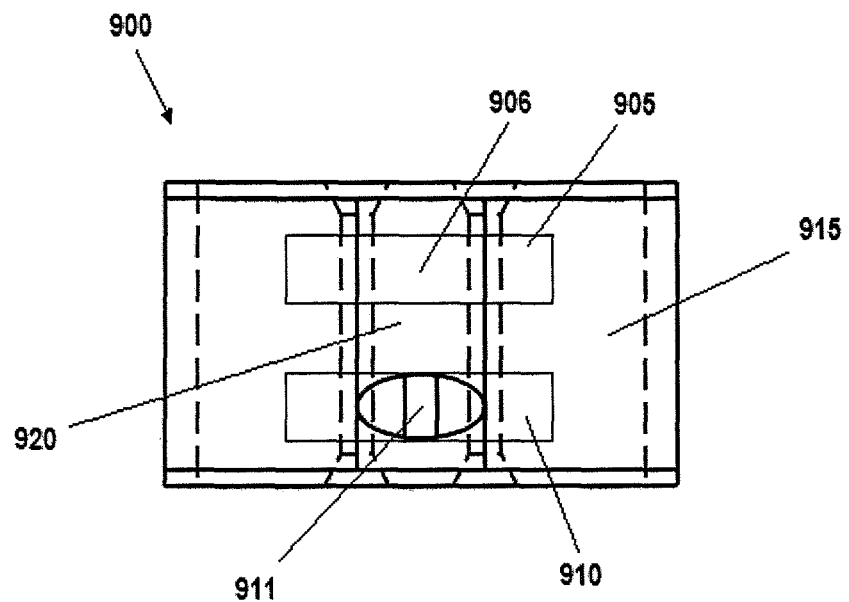
FIG. 9A illustrates a bottom view of a flippable two-side plunger according to an exemplary embodiment.

FIG. 9A illustrates a bottom view of a flippable two-side plunger according to an exemplary embodiment. Referring to FIG. 9A, the plunger 900 includes a first portion 905 and a second portion 910. The first portion 905 has a first rigid bending element 906 with a first bend radius, and the second portion 910 has a second rigid bending element 911 with a second bend radius larger than the first bend radius.

A flexible portion 915 surrounds the first and second portions 905, 910 and forms a separation 920 between the first and second portions 905, 910. The flexible portion 915 is contoured to the shape of the plunger 900 and minimizes ambient light entry into the first and second portions 905, 910. The flexible portion 915 may be formed from, for example but not limited to black urethane foam.

Figure 9B:
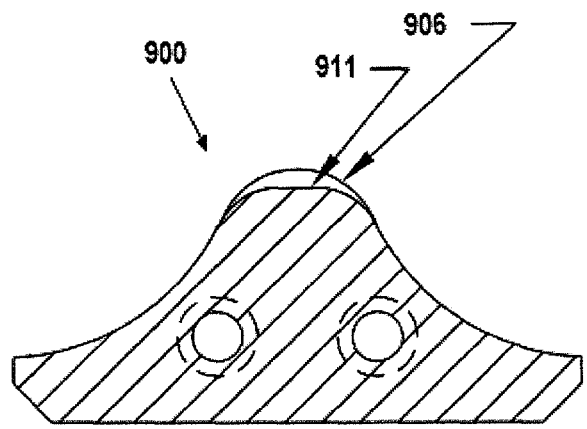
FIG. 9B is a cross section of a flippable two-side plunger illustrating first and second bend radii of first and second rigid bending elements according to an exemplary embodiment.

FIG. 9B is a cross section of a flippable two-side plunger illustrating first and second bend radii of first and second rigid bending elements according to an exemplary embodiment. Referring to FIG. 9B, the first rigid bending element 906 has a first bend radius, and the second rigid bending element 911 has a second bend radius which is larger than the first bend radius of the first rigid bending element 906. The flexible portion 915 is not shown in FIG. 9B.

Figure 9C:
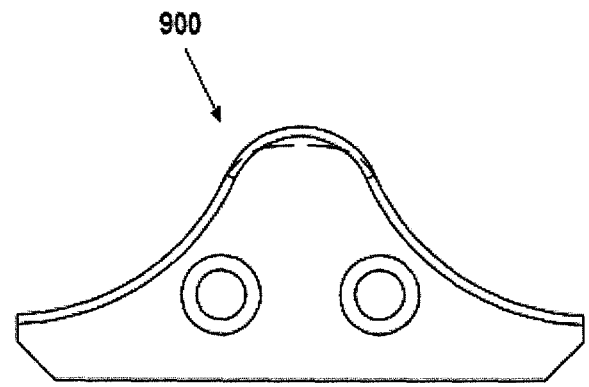
FIG. 9C is a side view illustrating the contour of a flippable two-side plunger according to an exemplary embodiment.

FIG. 9C is a side view illustrating the contour of a flippable two-side plunger according to an exemplary embodiment. The flexible portion 915 is not shown in FIG. 9C.

Two types of single mode optical fiber are popularly deployed in the FTTX-PON systems: standard SMF28e fiber and the bend insensitive fiber (BIF). The two types of optical fiber have significantly different bending characteristics; therefore, optical loss from the same bend radius and wavelength is quite different between the two types of fiber. Two different bend profiles provided by the first and second radii of the first and second portions 905, 910 of the plunger 900 allow different types of optical fibers, for example but not limited to, the standard SMF28-e and the BIF, to achieve the same amount of optical loss for coupling to the detector portion 1030 by bending the fibers to detect optical signal parameters.

Figure 9D:
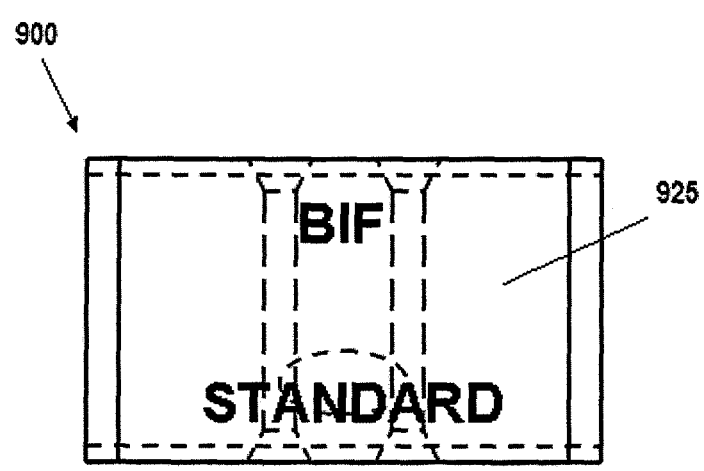
FIG. 9D is a top view of a flippable two-side plunger according to an exemplary embodiment.

FIG. 9D illustrates a top view of a flippable two-side plunger according to an exemplary embodiment. Referring to FIG. 9D, a top surface 925 of the flippable two-side plunger 900 may be labeled with, for example, "BIF" and "STANDARD" to identify a first portion 905 of the plunger 900 as a "BIF" side having the first rigid bending element 906 with a smaller bend radius and a second portion 910 of the plunger 900 as a "STANDARD" side having the second rigid bending element 911 with a larger bend radius than the "BIF" side. With such a design, an equal amount of optical can be achieved by inserting a BIF fiber onto "BIF" side and a standard SMF28-e onto "STANDARD" side, respectively.

Figure 10A:
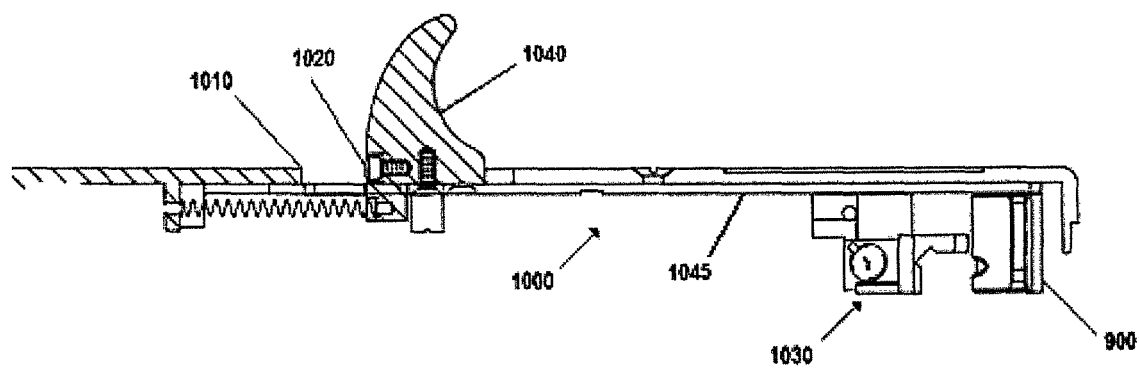
FIG. 10A illustrates a mechanism according to an exemplary embodiment.
Figure 10B:
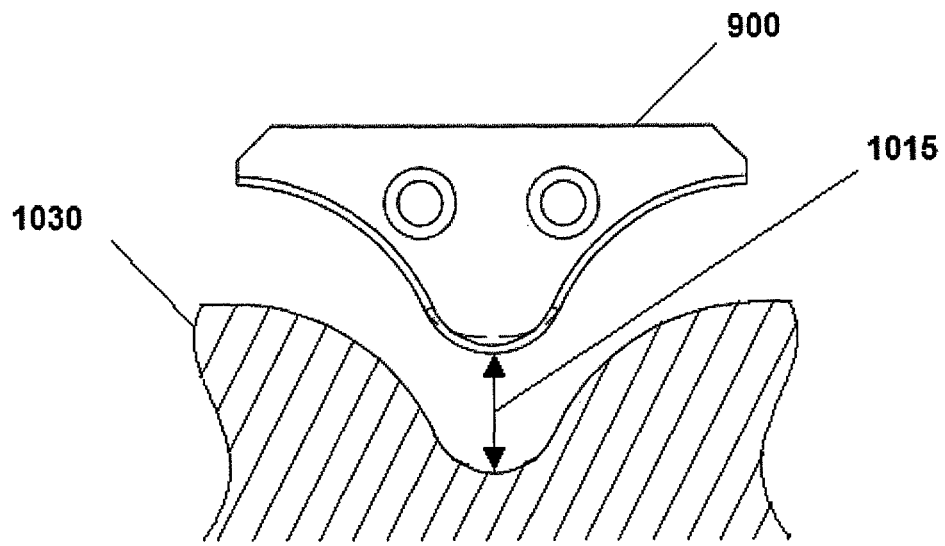
FIG. 10B illustrates a clearance between a plunger and a detector portion according to an exemplary embodiment.

FIG. 10A illustrates a mechanism according to an exemplary embodiment. Referring to FIG. 10A, a mechanism 1000 for moving the plunger 900 may be operated to cause the plunger 900 to bend the optical fiber 210 in a direction towards the detector portion 1030. A mechanism stop part 1010 may be disposed to stop plunger movement at a position to achieve a predetermined clearance 1015, as illustrated in FIG. 10B, between the plunger 900 and the detector portion 1030. For clarity, FIG. 10B illustrates the plunger without the flexible portion 915 attached. A mechanism stop adjusting part 1020 may be disposed on the mechanism 1000 to contact the mechanism stop part 1010 when the plunger 900 reaches achieves the predetermined clearance from the detector portion 1030.

The mechanism stop adjusting part 1020 may be adjusted to set the predetermined clearance. The mechanism stop adjusting part 1020 may be, for example but not limited to, a screw, a bolt, or other adjustable device. Alternatively, the mechanism stop adjusting part 1020 may not be adjustable. The mechanism stop part 1010 may be, for example but not limited to, a protrusion on a housing or frame of the Optical Fiber Identifier 200, a tab, or other element configured to contact the mechanism stop adjusting part 1020.

The mechanism 1000 may be operated with an operation part 1040, for example but not limited to, a trigger or button, in communication with a connecting portion 1045 to which a positioning part 1050 is attached. The positioning part 1050, which may be, for example but not limited to, a pair of metal pins or clamp arrangement for removeably retaining the plunger 900. Operation of the operation part 1040 results in movement of the connecting portion 1045 and therefore movement of the plunger 900. Movement of the connecting portion 1045 and plunger 900 stops upon contact of the mechanism stop adjusting part 1020 with the mechanism stop part 1010.

Figure 11:
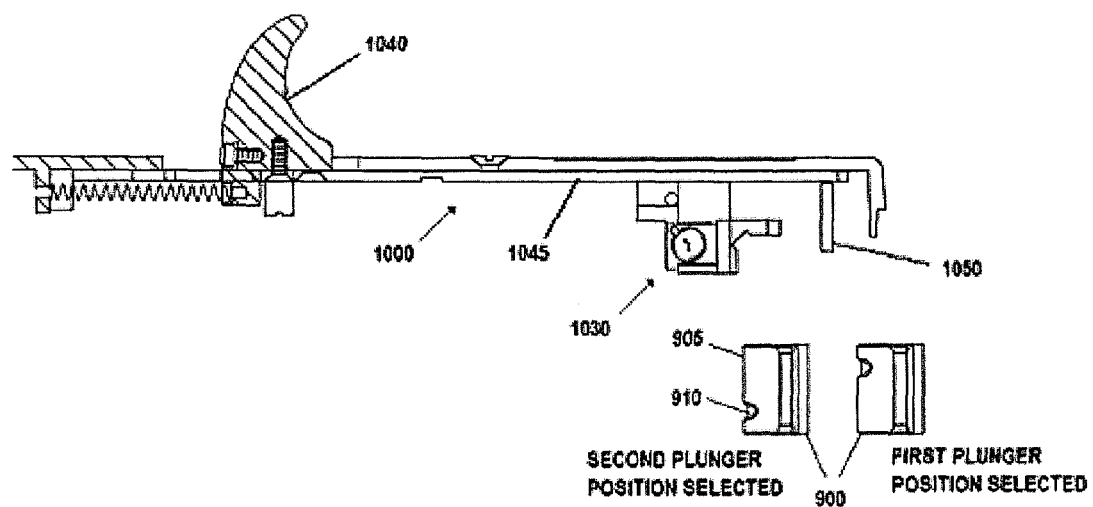
FIG. 11 illustrates repositioning of the plunger on the mechanism according to an exemplary embodiment.

FIG. 11 illustrates repositioning of the plunger on the mechanism according to an exemplary embodiment. Referring to FIG. 11, the plunger 900 may be repositioned on the mechanism 1000 by disengaging the plunger 900 from the positioning part 1050 of the mechanism 1000, orienting, i.e., flipping, the plunger 900 to select the first or second portions 905, 910 having the required bend radius, and reengaging the plunger 900 with the positioning part 1050. The plunger 900 includes a positioning portion 950 which engages the positioning part 1050 of the mechanism 1000. The positioning part 1050 of the mechanism 1000 may include, for example but not limited to, one or more pins extending from the mechanism 1000.

The positioning portion 950 of the plunger 900 may include, for example but not limited to, one or more corresponding slots to accept the one or more pins extending from the mechanism 1000. While one exemplary configuration of a positioning part 1050 of the mechanism 1000 and corresponding positioning portion 950 of the plunger 900 have been described, one of ordinary skill in the art will recognize that other configurations for removably attaching the plunger 900 to the mechanism 1000 are possible without departing from the scope of the exemplary embodiments.

Figure 12:
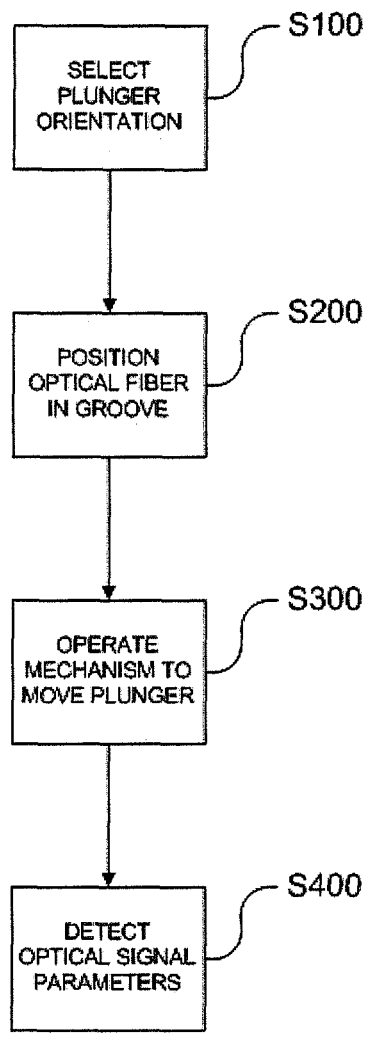
FIG. 12 is a flowchart illustrating a method of identifying signals in an optical fiber according to an exemplary embodiment.

FIG. 12 is a flowchart illustrating a method of identifying signals in an optical fiber according to an exemplary embodiment. Referring to FIG. 12, a plunger orientation is selected by positioning the plunger 900 to align the first portion 905 of the plunger 900 having a first bend radius with the detecting portion 1030 or positioning the plunger 900 to align the second portion 910 of the plunger 900 having a second bend radius with the detecting portion 1030 (S100).

An optical fiber 210 is positioned in a fiber groove 220 (see FIG. 2) of the housing 205 of the Optical Fiber Identifier 200 (S200). The mechanism (1000) is operated to move the plunger 900 towards the detecting portion 1030 to bend the optical fiber 110 until a predetermined clearance between the plunger 900 and the detecting portion 1030 is reached (S300). Optical signal parameters of the optical fiber 210 are then detected with the detecting portion 1030 (S400).

Although the exemplary embodiment of the present invention have been described, it will be understood by those skilled in the art that the present invention should not be limited to the described exemplary embodiments, but various changes and modifications can be made within the spirit and the scope of the present invention. Accordingly, the scope of the present invention is not limited to the described range of the following claims.

What is claimed is:

1. A signal identifying apparatus for an optical fiber, the apparatus comprising:
    a plunger which bends an optical fiber;
    a detecting portion which detects optical signal parameters from the optical fiber; and
    a mechanism which moves the plunger in a direction towards the detecting portion to bend the optical fiber;
    wherein the plunger comprises a first portion having a first bend radius and a second portion having a second bend radius larger than the first bend radius; and
    wherein the plunger is a flippable two-side plunger repositionable in the apparatus, and
    when the plunger has a first position in the apparatus, the plunger is configured to bend an optical fiber with the first portion having a first bend radius;
    when the plunger has a second position, flipped with respect to the first position, the plunger is configured to bend an optical fiber with the second portion having a second bend radius.

2. The signal identifying apparatus of claim 1, further comprising:
    a housing comprising a fiber groove for positioning an optical fiber;
    wherein the detecting portion is disposed in the housing;
    wherein the plunger is disposed in the housing adjacent to the fiber groove; and
    wherein the mechanism is disposed in the housing such as to move the plunger in a direction toward the detecting portion and to bend an optical fiber disposed in the fiber groove.

3. The apparatus of claim 1, wherein the plunger comprises:
    a first-side and a second-side substantially parallel with each other;
    wherein the first-side is facing a first surface of the apparatus when the plunger has the first position in the apparatus;
    wherein the second-side is facing the same first surface when the plunger has the second position in the apparatus.

4. The apparatus of claim 1,
    wherein the first bend radius of the first portion is configured to achieve a first amount of optical loss in a first-type of fiber;
    wherein the second bend radius of the second portion is configured to achieve a second amount of optical loss in a second-type of fiber; and
    wherein the first optical loss is substantially equal with the second optical loss.

5. The apparatus of claim 4, wherein the first-type of fiber is a standard SMF28-e fiber, whereas the second-type of fiber is a bend insensitive BIF fiber.

6. A signal identifying apparatus for an optical cable, the apparatus comprising:
    a plunger which bends an optical fiber;
    a detecting portion which detects optical signal parameters from the optical fiber; and
    a mechanism which moves the plunger in a direction towards the detecting portion to bend the optical fiber;
    wherein the plunger comprises a first portion having a first bend radius and a second portion having a second bend radius larger than the first bend radius; and
    wherein the plunger further comprises a flexible portion surrounding the first and second portions such that the flexible portion prevents entry of ambient light into the first and second portions.

7. The signal identifying apparatus of claim 6, wherein the flexible portion further provides a separation between the first and second portions.

8. The signal identifying apparatus of claim 6, further comprising:
    a housing comprising a fiber groove for positioning an optical fiber;
    wherein the detecting portion is disposed in the housing;
    wherein the plunger is disposed in the housing adjacent to the fiber groove; and
    wherein the mechanism is disposed in the housing such as to move the plunger in a direction toward the detecting portion and to bend an optical fiber disposed in the fiber groove.

9. The signal identifying apparatus of claim 8, further comprising:
    a positioning part disposed on the mechanism for positioning the plunger,
    wherein the plunger is repositionable on the positioning part in a first position for bending an optical fiber with the first portion having a first bend radius or in a second position for bending an optical fiber with the second portion having a second bend radius.

10. A signal identifying apparatus for an optical cable, the apparatus comprising:
- a plunger which bends an optical fiber;
- a detecting portion which detects optical signal parameters from the optical fiber;
- a mechanism which moves the plunger in a direction towards the detecting portion to bend the optical fiber;
- a mechanism stop part; and
- a mechanism stop adjusting part;
- wherein the mechanism operates to move the plunger in the direction towards the detecting portion until the mechanism contacts the mechanism stop part;
- wherein the mechanism stop part is disposed to stop movement of the mechanism at a position which provides a predetermined clearance between the plunger and the detecting portion when the mechanism is operated to move the plunger, and
- wherein the mechanism stop adjusting part is adjustable for setting the predetermined clearance.

11. The signal identifying apparatus of claim 10, wherein the mechanism maintains the plunger at a position greater than the predetermined clearance in a direction away from the detecting portion when the mechanism is not operated to move the plunger.

12. The signal identifying apparatus of claim 10, further comprising:
- a housing comprising a fiber groove for positioning an optical fiber;
- wherein the detecting portion is disposed in the housing;
- wherein the plunger is disposed in the housing adjacent to the fiber groove;
- wherein the mechanism is disposed in the housing such as to move the plunger in a direction toward the detecting portion and to bend the optical fiber disposed in the fiber groove;
- wherein the mechanism stop part is disposed to stop movement of the mechanism at a first position which provides a predetermined clearance between the plunger and the detecting portion when the mechanism is operated to move the plunger towards the detecting portion, and
- wherein the mechanism maintains the plunger at a second position greater than the predetermined clearance away from the detecting portion when the mechanism is not operated to move the plunger.

13. A method of identifying signals in an optical fiber with a signal identifying apparatus, the method comprising:
- selecting a first plunger orientation, out of two plunger orientations, by positioning the plunger to align a first portion of the plunger having a first bend radius with a detecting portion; or selecting a second plunger orientation aligning a second portion of the plunger having a second bend radius larger than the first bend radius with the detecting portion;
- positioning the optical fiber in a fiber groove in a housing of the signal identifying apparatus;
- operating a mechanism to move the plunger towards the detecting portion to bend the optical fiber until a predetermined clearance between the plunger and the detecting portion is reached; and
- detecting optical signal parameters with the detecting portion.

14. The method of claim 13, further comprising setting the predetermined clearance by adjusting a mechanism stop adjusting part.

15. The method of claim 13, wherein the detected optical signal parameters comprise at least one of signal presence, signal frequency, signal direction in the optical fiber, and peak power of the signal.

* * * * *